HIGH REPETITION RATE PULSE GENERATOR
Filed Sept. 4, 1964
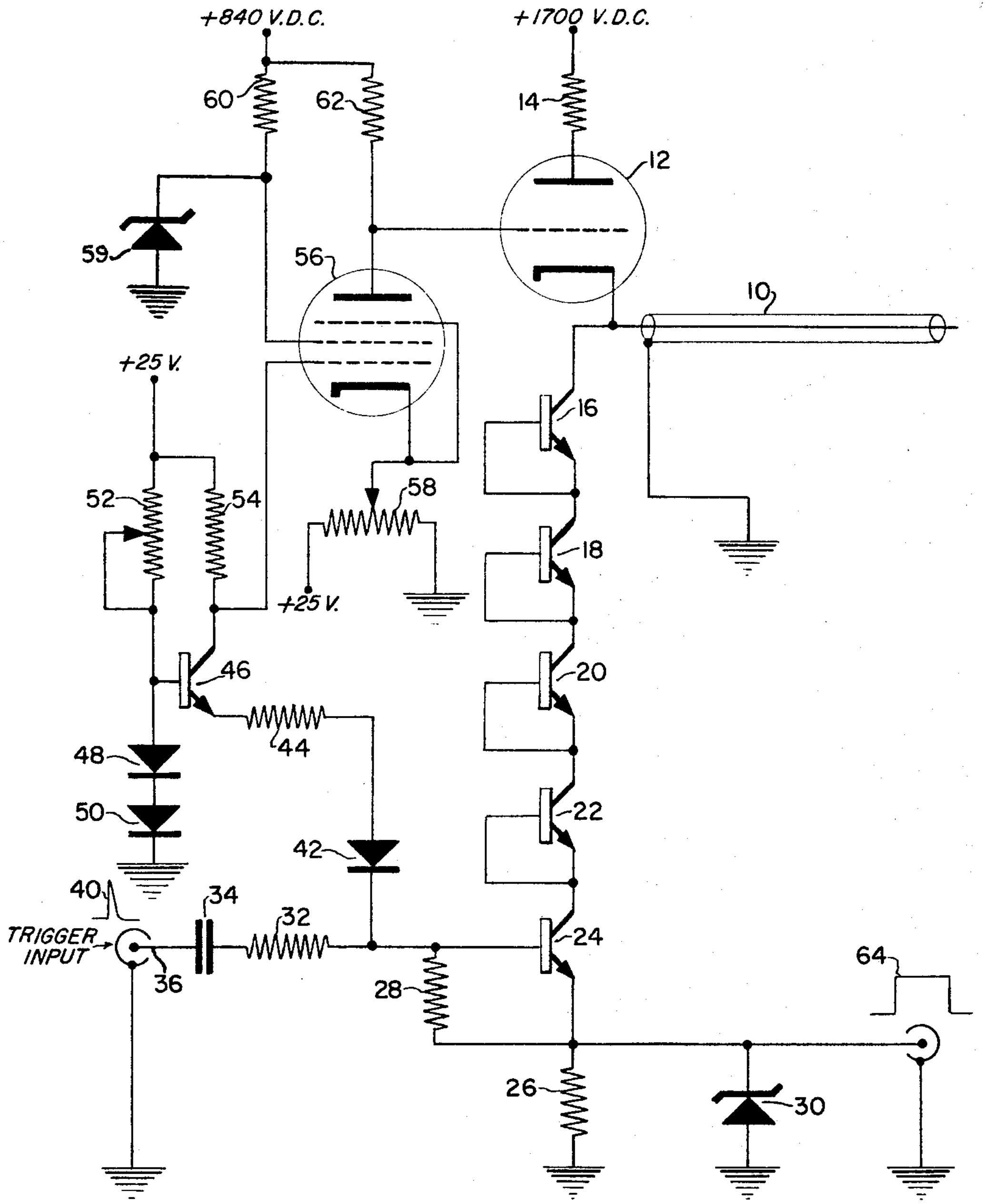
INVENTOR:
JOHN J. HICKEY,
BY Jerry A. Dinardo
AGENT.

United States Patent Office 3,268,822
Patented August 23, 1966

3,268,822
HIGH REPETITION RATE PULSE GENERATOR

John J. Hickey, Hawthorne, Calif., assignor to TRW Inc., a corporation of Ohio

Filed Sept. 4, 1964, Ser. No. 394,584
6 Claims. (Cl. 328—67)

This invention relates to electrical pulse generation, and more specifically to improved means for generating high voltage, low impedance, fast rise time pulses at very high repetition rates.

The pulse generating means of this invention may be used for gating the grid of an image converter camera tube of the kind disclosed in U.S. Patent 3,096,484 issued to G. L. Clark, or for pulsing transmitting tubes.

An object of this invention is the provision of a pulse generating circuit capable of producing high voltage, low impedance pulses with fast rise times and at high repetition rates.

Another object is the provision of circuit means for producing voltage pulses having amplitudes of 300 volts or more at repetition rates of 100 kilocycles and above, having rise times less than 2 nanoseconds into impedances as low as 50 ohms.

The single figure is a schematic representation of an embodiment of the high repetition rate pulse generating circuit according to the invention.

Referring to the drawing, the pulse generator includes an energy storage device or pulse forming network 10 connected in series with a charging network. The charging network includes a first vacuum tube 12, such as a triode, having its cathode connected to one end of the pulse forming network 10. The anode of the tube 12 is connected through a current limiting resistor 14 to a positive direct current voltage supply, such as 1700 volts.

The cathode of the first vacuum tube 12 is connected in series with an avalanche transistor circuit including five avalanche transistors 16, 18, 20, 22, 24. The number of transistors used depends on the desired output pulse amplitude. The cathode of the tube 12 is connected to the collector of the first transistor 16. Each of the transistors 16–22 has its emitter connected to the collector of the next succeeding transistor. The last transistor 24 has its emitter connected in series with a load resistor 26. The base and emitter of each of the first four transistors 16–22 are short circuited, whereas a low resistance resistor 28 is connected between the base and emitter of the last transistor 24. A Zener diode 30 is connected across the load resistor 26 to limit the amplitude of the voltage pulse developed thereacross.

The base of the last transistor 24 is connected through a resistor 32 and coupling capacitor 34 to an input line 36. A trigger pulse 40 applied to the input line 36 will appear on the base of the transistor 24.

The last transistor 24 and resistors 26 and 28 constitute a current sensing means that is used to sense the current flowing therethrough in series with the transistors 16–22. In response to the current sensed thereby, the current sensing means serves to control the current supplied to the pulse forming network 10 from the charging network including the first vacuum tube 12 resistor 14 and the voltage supply. The base of the transistor 24 is connected in a feedback circuit to the cathode of a semiconductive diode 42. No current flows through the resistors 26 and 28. The anode of the diode 42 is connected through a resistor 44 to the emitter of an avalanche transistor 46.

The base of the transistor 46 is biased positively by connection to the junction between a pair of forward biased semiconductive diodes 48 and 50 and a variable resistor 52. The diodes 48 and 50 and the resistor 52 form a voltage divider network with a positive direct current bias supply, such as 25 volts. The variable resistor 52 establishes the base voltage on the transistor 46 by adjusting the forward current through the diodes 48 and 50. The collector of the transistor 46 is connected through a resistor 54 to the positive bias supply.

The collector of the transistor 46 is connected to the grid of a second vacuum tube 56, such as a pentode. The cathode of the tube 56 is connected to the variable arm of a potentiometer 58, which is connected across a positive bias supply, such as 25 volts, to establish the cathode voltage of the tube 56.

The screen grid of the tube 56 receives a positive operating potential of 100 volts by connection to a zener diode 59 which is series connected with a screen resistor 60 to a positive direct current voltage supply, such as 840 volts. The anode of the second vacuum tube 56 is connected to the grid of the first vacuum tube 12. The anode of the second tube 56 receives a positive operating potential by connection through an anode resistor 62 to a high voltage supply such as 840 volts.

The operation of the pulse generator will now be described. In the quiescent state of the circuit, the avalanche transistors 16–24 are initially nonconducting because their collector voltages are below the breakdown voltage between collector and emitter ($BV_{CES}$). The base of the last series transistor 24 is therefore at zero or ground potential.

The transistor 46 in the feedback circuit is conducting because the emitter thereof is referenced through the resistor 44 and diode 42 to the low potential on the base of the transistor 24. The transistor 46 being conducting, its collector is at a low potential. The control grid of the second vacuum tube 56, which is connected to the collector of the transistor 46, is also at a low potential relative to the cathode, and therefore the second tube 56 is cut off.

Since the second tube 56 is cut off, its anode is at a high potential. The control grid of the first vacuum tube 12, which is connected to the anode of the second tube 56, is also at a high positive potential. Therefore, the tube 12 is conducting heavily, with the current being limited mainly by the current limiting resistor 14.

With the transistors 16–24 cut off and the tube 12 conducting heavily, the pulse forming network 10 charges towards the positive supply of 1700 volts. Thus, in its conducting state the tube 12 serves as a high conductance path for charging the pulse forming network 10.

When the voltage on the pulse forming network 10 reaches the sum of the breakdown voltages ($BV_{CES}$) of the series transistors, an increasing current flows through the collector-base junctions of the transistors, thereby causing a voltage drop across the resistor 28 and the load resistor 26, the base of the last transistor 24 being positive relative to ground. The positive change in the reference voltage across the resistor 28 causes the current through the series network of the diode 42 and resistor 44 to the emitter of the transistor 46 to decrease. Accordingly, the collector current flowing through the transistor 46, which is connected as a common base amplifier, is reduced. The voltage on the collector of the transistor 46 and on the control grid of the second tube 56 increases, causing the latter tube 56 to conduct.

When the tube 56 conducts, the plate voltage thereof decreases, and so does the grid voltage of the first tube 12. The reduction in grid voltage of the first tube 12 causes the latter to conduct less current, the tube 12 now appearing as a lower conductance. As a result, the current through the collector-base junctions of the series transistors 16–24 is caused to increase at a decreasing rate. Through the regenerative process a steady direct current is established through the transistors 16–24. The level at which the steady current through the transistors 16–24 stabilizes is determined by the settings of the resistors 52 and 58.

In order to generate a rectangular voltage pulse, a trigger pulse 40 is applied to the input line 36. A trigger pulse 40 of 100 volts, for example, causes transistors 24 and 22–16 to avalanche in rapid succession in that order, thereby reducing the impedance of the series transistors. The voltage on the pulse forming network 10 thereupon discharges through the collector-emitter junctions of the transistors 16–24, to generate a rectangular voltage pulse 64 across the load resistor 26, which is clipped by the zener diode 30 to some value such as 300 volts.

The output pulse is seen on the base of the transistor 24. This large positive pulse is seen as an increase in the reference voltage to the emitter of the transistor 46 through the diode 42 and resistor 44. Now being back biased, the diode 42 prevents current from flowing in the emitter circuit of the transistor 46, thereby cutting off the latter completely. The potentials of the collector of the transistor 46 and the grid of the second tube 56 rise towards the supply voltage of 25 volts, thereby causing the tube 56 to conduct heavily, whereupon the first tube 12 is cut off. The tube 12 is now in a nonconducting state.

Following the complete discharge of the pulse forming network 10 the transistors 16–24 no longer receive any current, due to the blocking action of the first tube 12, and are caused to shut off. When this occurs, the voltage on the base of transistor 24 returns to zero, thereby turning ing on transistor 46, turning off the second tube 56, and turning on the first tube 12. Turning on the first tube 12 causes the pulse forming network 10 to recharge rapidly.

When the pulse forming network 10 is charged to a voltage approximately equal to the breakdown voltages ($BV_{CES}$) of the transistors 16–24, a small current starts to flow through the transistors 16–24. This causes a positive voltage to appear at the base of the transistor 24, thereby initiating the current regulating action of transistor 46, and tubes 56 and 12, until the equilibrium state previously described is reestablished. The circuit is now ready for the reception of another trigger pulse.

The maximum recharging current is limited by the limiting resistor 14 which is determined by the power rating of transistors 16–24. The insertion of the first tube 12 in the recharging circuit allows one to reduce the resistance value of the resistor 14, thereby increasing the maximum recharging current and enabling the circuit to operate at a much higher repetition rate.

According to one operative embodiment the following circuit values were used:

| | |
|---|---|
| Pulse forming network 10 | 15 ft. RG58/U Coaxial Cable. |
| Vacuum tube 12 | Type 12AT7. |
| Resistor 14 | 200K. |
| Transistors 16–24 | (5) Type PT2473. |
| Resistor 26 | 1K. |
| Resistor 28 | 1K. |
| Zener diode 30 | (2) Type 1N988. |
| Resistor 32 | 10K. |
| Capacitor 34 | 100 picofarads. |
| Diode 42 | Type 1N643. |
| Resistor 44 | 1K. |
| Transistor 46 | Type 2N697. |
| Diodes 48 and 50 | (2) Type 1N643. |
| Resistor 52 | 5K. |
| Resistor 54 | 50K. |
| Tube 56 | Type 6AU6. |
| Potentiometer 58 | 5K. |
| Zener diode 59 | Type 1N985. |
| Resistor 60 | 1 megohm. |
| Resistor 62 | 10 megohms. |

With the above circuit values rectangular voltage pulses of 300 volts amplitude and 20 nanosecond pulse width were generated with repetition rates in excess of 10 kilocycles.

The embodiments of the invention in which an exclusive property or privilege is claimed are defined as follows:

1. A pulse generating circuit, comprising:
an energy storage device adapted to be charged to a predetermined voltage;
a first path in circuit with said energy storage device and including means for charging said energy storage device to said predetermined voltage, said means including continuously variable conductance means for controlling current to said energy storage device;
a second path in circuit with said energy storage device, said path including initially open switch means, load impedance means and a current sensing means in series circuit with each other; said switch means being energizable by an input pulse to discharge current from said energy storage device through said series circuit;
and a feedback path coupling said current sensing means to said continuously variable conductance means, and provided with means (a) for increasing the conductance of said continuously variable conductance means to a high value when no current is sensed by said current sensing means, thereby to rapidly charge said energy storage device, (b) for decreasing the conductance of said continuously variable conductance means to an intermediate value when low current is sensed by said current sensing means, thereby to establish a steady state bias current through said switch means, and (c) for decreasing the conductance of said continuously variable conductance means to a lowest value when high current is sensed by said current sensing means;
and means for applying an input trigger pulse to said switch means to cause said energy storage device to discharge current therethrough and to develop an output pulse across said current sensing means and load impedance means;
whereupon said output pulse is coupled through said feedback path to disable said continuously variable conductive means for a period of time sufficient to allow said switch means to recover to its initially open state.

2. The invention according to caim 1, wherein said continuously variable conductance means comprises a vacuum tube amplifier circuit.

3. The invention according to claim 1, wherein said switch means comprises an avalanche transistor switching circuit.

4. The invention according to claim 3, wherein said current sensing means is an integral part of said avalanche transistor switching circuit.

5. The invention according to claim 1, wherein said feedback path includes a transistor amplifier circuit.

6. The invention according to claim 1, wherein said feedback path includes a vacuum tube amplifier circuit.

References Cited by the Examiner

UNITED STATES PATENTS 3,167,661 1/1965 Rhodes ------------ 307—88.5

ARTHUR GAUSS, *Primary Examiner.*

J. ZAZWORSKY, *Assistant Examiner.*